United States Patent [19]

Brand

[11] 4,393,723
[45] Jul. 19, 1983

[54] FLUID FLOW METER

[76] Inventor: Glen Brand, 4114 N. 79th, Omaha, Douglas County, Nebr. 68134

[21] Appl. No.: 254,675

[22] Filed: Apr. 16, 1981

[51] Int. Cl.³ ............................................. G01F 1/11
[52] U.S. Cl. .............................. 73/861.72; 73/861.76; 73/861.89
[58] Field of Search ........... 73/861.71, 861.72, 861.76, 73/861.89

[56] References Cited

U.S. PATENT DOCUMENTS

| 1,510,689 | 10/1924 | Manifold | 73/861.72 |
| 1,665,141 | 4/1928 | Mayer | 73/861.72 |
| 2,422,762 | 6/1947 | Williams | 73/861.72 |
| 2,483,190 | 9/1949 | Evans | 73/861.72 |
| 3,377,856 | 4/1968 | Hasegawa . | |
| 3,811,323 | 5/1974 | Swenson . | |
| 4,041,891 | 8/1977 | Rosaen . | |
| 4,186,603 | 2/1980 | DuBae . | |

Primary Examiner—Howard A. Birmiel
Attorney, Agent, or Firm—Henderson & Sturm

[57] ABSTRACT

A fluid flow meter with a turbine rotationally supported within a transparent cylindrical housing and biased against its rotational response to the flow of fluid whereby flow rates are read on a circumferential scale mounted on the turbine. In an alternative embodiment, in addition to rotational movement the turbine is biased against axial movement whereby a helical scale mounted on the turbine may be calibrated and read along more than a single 360° of angular movement. In another alternative embodiment, a compression spring in combination with a threaded axle which mates with a threaded cavity within the turbine, provides helical displacement of the turbine for permitting the calibration of more than 360° of angular rotation.

10 Claims, 5 Drawing Figures

FLUID FLOW METER

BACKGROUND OF THE INVENTION

This invention relates generally to fluid flow meters and more particularly to meters which translate the proportionate travel of an object within the meter housing which is biased against the direction of flow of the fluid being measured.

A simple and inexpensive meter of this type is comprised of a bullet-nosed object held against the fluid flow by a compression spring which is centrally supported within a housing. The downstream deflection of the object is calibrated and read through a window in the housing or transparent length of pipe. Although these devices have generally performed satisfactorily, for more accuracy a longer more precise spring is required, sometimes thus precluding their practicality where space is a factor. Also their inherent economy is compromised since the cost of springs which will perform adequately increases geometrically as they are lengthened.

More complex meters of this type such as that disclosed in U.S. Pat. No. 4,041,891, employ propellers which are biased against the direction of flow by torsion springs. However, in these devices the springs are typically located outside the housing in which the fluid is flowing, thus requiring special treatment to seal off a dry spring and indicator chamber and requiring other additional components in the form of seals, gears and various moving parts.

Other meters employ propellers by measuring their rotational speed and also must transfer readings externally by structures more complex than a window or transparent length of pipe. Some of these structures include routing the liquid out of its general path of flow so that the propeller can be normal thereto, use of a worm gear in order that the propeller can be normal to the general path of fluid flow, and counting electronic pulses transmitted through a non-conductive housing by ferromagnetic elements on the propeller. All of these latter types of rate of flow meters can be relatively accurate in a confined space, but also are complex devices requiring high initial cost and expensive maintenance.

SUMMARY OF THE INVENTION

An object of the present invention is the provision of an improved fluid flow meter.

Another object is to provide a fluid flow meter, which has few mechanical moving parts, but which can provide a relatively high degree of accuracy.

A further object of the invention is the provision of a fluid flow meter which occupies little space and still provides a relatively high degree of accuracy.

Still another object is the provision of a fluid flow meter which does not require separate dry chambers for biasing springs and flow rate indicators or, alternatively, expensive electronic reading devices.

A still further object is to provide a fluid flow meter which does not require additional lateral space for the location of separate dry indicator chambers.

According to the present invention the foregoing and other objects are attained by affixing within a section of pipe, which services as a meter housing, a supporting structure at the outlet end of said housing on which a turbine would rotate axially in response to the fluid flow but for a torsion spring affixed at its peripheral end to the supporting structure and at its central end to the turbine, the circumferential displacement of said turbine indicating the relative fluid flow rate. Thus a circumference roughly equal in length to the internal circumference of the fluid conduit is available for calibrating a flow rate scale.

Alternative embodiments provide for more than 360° of angular displacement of the turbine, resulting in even greater accuracy (multiples of the fluid conduit circumference) for a relatively minor increase in length of the meter housing. In one of these embodiments axial movement as well as rotational movement of the turbine is provided by the addition of a compression spring between the turbine and the supporting structure. As the flow rate increases the turbine will be displaced axially as well as circumferentially thus permitting the calibration of more than 360° on a scale helical in geometry. In the other such embodiment, in which the torsion spring is not used, the compression spring in combination with a long-pitch thread on the axle which cooperates with an internal thread in the turbine provides for helical displacement of the turbine.

Other objects, advantages and novel features of the present invention will become apparent from the following detailed description of the invention when considered in conjunction with the accompanying drawings.

DESCRIPTION OF THE PREFERRED AND ALTERNATIVE EMBODIMENTS

Figures 1, 2:
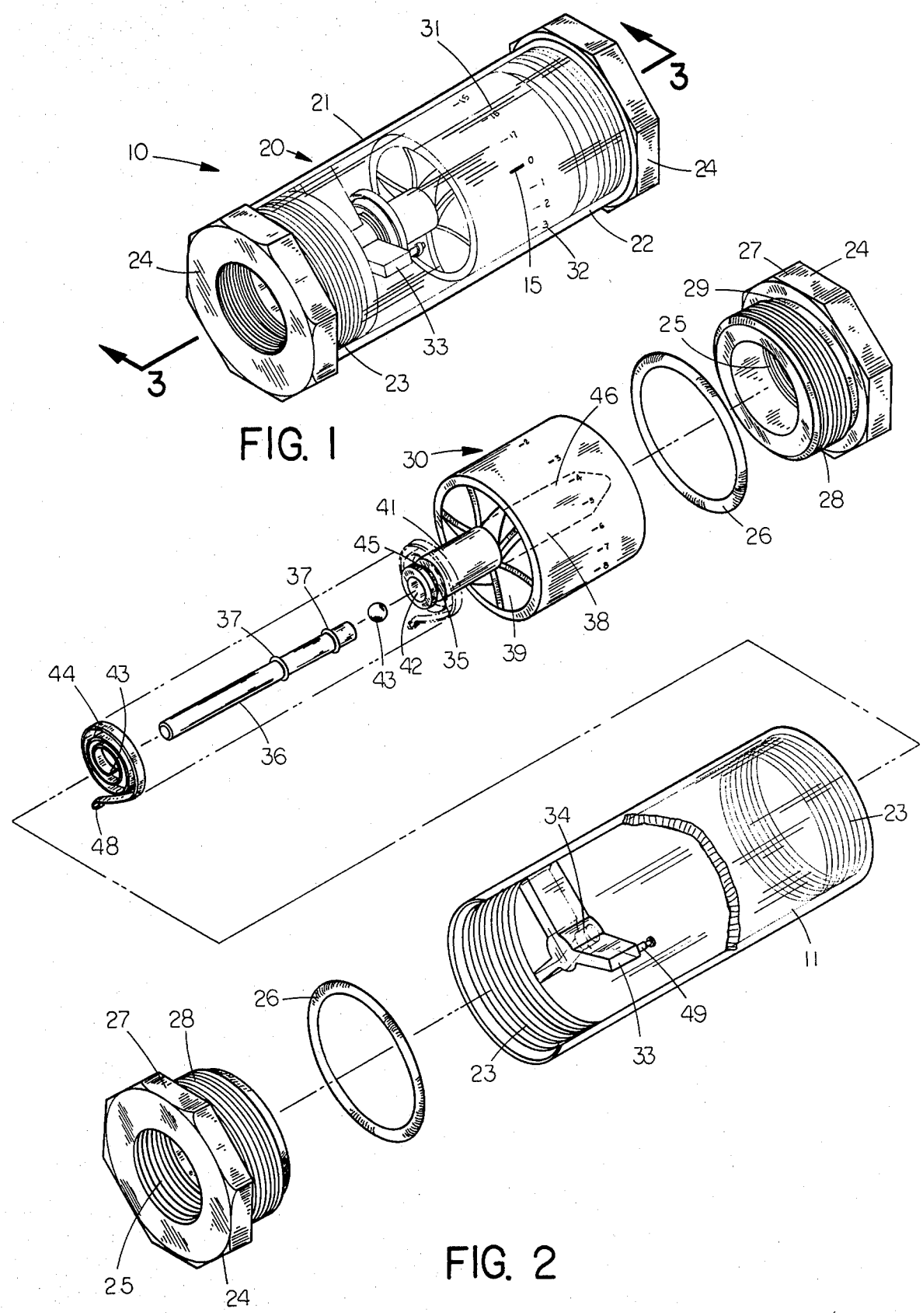
FIG. 1 is a perspective view of the preferred embodiment of my fluid flow meter in its assembled form.
FIG. 2 is an exploded perspective view showing the preferred embodiment of my fluid flow meter, which indicates the relative position of its elements, and which includes a partial internal view of a housing member.

Referring now to the drawings wherein like numerals designate identical or corresponding parts throughout the several views, and more particularly to FIG. 1, whereon the meter is depicted generally at 10, its key elements are viewed enclosed within a housing assembly 20 which is comprised of a transparent cylindrical tube 21 having an inlet end 22 and an outlet end 23, two identical bolt-head fittings 24 for threaded conjoinment within either end of transparent tube 21, and identical rubber seal rings 26 for use with each fitting 24. As can be best seen in FIG. 2, bolt-head fitting 24 is generally cylindrical in shape having a central hollow core, its wall being L-shaped in cross-section, the horizontal leg of the "L" representing an external bolt-head shaped projection 27 for the application of torque with a wrench and the vertical leg of the "L" representing the wall of the hollow cylinder having thereon external threads 28 distal the bolt-head configuration 27 for cooperation with internal threads in either end of tube 21 and internal threads 25 thereon proximal the bolthead configuration 27 for conjoinment with the adjacent upstream and downstream fluid conduits. Between configuration 27 and external threads 28 is a seal ring retainer space 29 for the location of compressible seal ring 26. The bolt-head fitting 24 makes it possible to adjustably install the fluid flow meter 10 within a standard section of pipe through which a fluid is conducted by removing a section thereof appropriate a length and appropriately threading freed ends of the conduit.

Within housing assembly 20 and co-axial with it is cylindrical scale 31 which includes numerical designations 32 for reading comparative flow rates against hairline mark 15, said mark 15 being located on the surface of transparent tube 21 and adjacent to numerical designations 32. A novel feature of my flow meter is the circumferential translation onto scale 31 of the linear rate of flow of a fluid through the meter, thus making available the full circumference of cylindrical scale 31 for calibrating flow rates. The means by which cylindrical scale 31 rotates in response to changes in fluid flow rates will be explained hereinafter.

Figures 3, 4, 5:
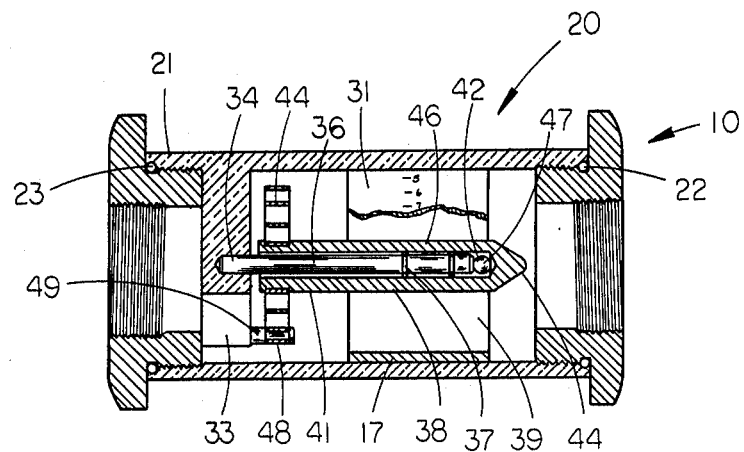
FIG. 3 is a cross-sectional view of the preferred embodiment of my fluid flow meter taken along line 3—3 of FIG. 1.
FIG. 4 is a cross-sectional view of an alternative embodiment of my fluid flow meter which indicates its differences with the preferred embodiment of FIGS. 1, 2 and 3.
FIG. 5 is a cross-sectional view of another alternative embodiment of my fluid flow meter which indicates its differences with the preferred embodiment of FIGS. 1, 2 and 3.

Visible in FIGS. 1, 2 and 3, but best seen in FIG. 2 is supporting structure base 33. Base 33 in this embodiment is a three-legged spider which may be integral with or affixed in a well known matter to the inside wall of cylinder 21 adjacent the threads at outlet end 23. Supporting structure base 33 has a center cylindrical axle supporting cavity 34 in its upstream face which is co-axial with housing assembly 20 and which can be seen in FIG. 3 and is best depicted by dashed lines in FIG. 2. Rigidly supported within cavity 34 is an axle 36. Axle 36 could be integral with supporting structure base 33. The use of either a free or an integral axle being dictated by other than functional considerations.

As can be seen in FIG. 2, axle 36 has mounted thereon in spaced apart relationship two O-rings 37 for the provision of a minimal frictional surface upon which a turbine assembly, designated generally at 30, can revolve in response to the flow of a fluid through the meter. Turbine assembly 30 is comprised of a hub member 38, vane members 39 and cylindrical scale members 31 which was described hereinabove. Hub member 38 has an external axially centered, cylindrical portion 41 with a co-axial cylindrical cavity 42 for the insertion therein of the upstream end of axle 36 and bearing O-rings 37 and for the affixation to the downstream end thereof of the central end 43 of torsion spring 44 by its insertion into slot 35 of constriction 45. To the internal extension 46 of hub 38 within turbine assembly 30 are affixed equi-angular radially outwardly directed vanes 39 and within internal extension 46 of hub 38 cylindrical cavity 42 is continued so far as to prevent hub 38 from being moved by fluid pressure against supporting structure base 33. This relationship can best be appreciated by viewing FIG. 3 which shows the length of cylindrical cavity 42 to be slightly less than the length of the portion of axle 36 which protrudes upstream from supporting structure base 33 plus the diameter of a ball bearing 47. Also best understood by viewing FIG. 3 is the fact that frictional impediments to the accuracy of my meter are minimized by the use of but two O-ring bearings 37 and a single ball bearing 47, O-rings 37 having a surface of Teflon or the like. Where hub 38 protrudes upsteam beyond vanes 39 and cylindrical scale 31, it is bullet-nosed in configuration for reducing tubulence and maintaining the even balance of turbine assembly 30 upon axle 36. Cylindrical scale 31 which is co-axial with housing assembly 20, axle 36, and hub 38 is affixed at its internal wall to the radial extension of each of the vanes 39.

To complete this preferred embodiment 10 of my meter, turbine assembly 30 and the internal wall of tube 21 of housing assembly 20 is connected to torsion spring 44 at its peripheral end 48 through a post 49 which protrudes upstream from one leg of supporting structure base 33. It should be appreciated that the connection to tube 21 does not necessarily have to be done through base 33. In the embodiment depicted herein, the vanes 39 are conformed so as to turn turbine assembly 30 clockwise with respect to the upstream end of housing assembly 20 in response to the flow of a fluid through the meter, and torsion spring 44 is oriented so as to bias turbine assembly 30 in the counter-clockwise direction.

Referring now to FIG. 4, an alternative embodiment of my fluid flow meter is depicted generally at 10a. The following description of this embodiment will rely on the foregoing description of the preferred embodiment 10 for elements which are structurally and functionally the same by merely appending an "a" to the comparable numerical designations. Analogous elements will also employ the appended "a" with essential differences only described.

Housing assembly 20a is shown to differ from housing assembly 20 of the preferred embodiment 10, in that transparent tube 21a is longer than its counterpart, tube 21 of housing assembly 20, in relation to the comparative lengths of its hub member 38a and hub member 38. Supporting base member 33a being located the same relative distance from the outlet end 23a of tube 21a as its counterpart, supporting base member 33 of housing assembly 20 is from outlet end 23, space downstream from hub member 38a is provided for the movement of hub member 38a along axle 36a.

In this embodiment of my fluid flow meter, turbine assembly 30a is in the same relative position with respect to inlet end 22a of housing assembly 20a as is turbine assembly 30 with respect to housing assembly 20 in the preferred embodiment 10 when the fluid flow rate is zero. In embodiment 10a an additional element in the form of a compression spring 51 is located within cavity 42a and interposed between ball bearing 47a and the upstream end of cavity 42a. This compression spring is of a design which will enable it to resist downstream movement of turbine assembly 30a a sufficient distance to enable number designations 32a aligned helically on cylindrical scale 31a to be read against a hairline mark 15a (not visible in FIG. 4) located on the surface of transparent tube 21a at flow rates above that which cause turbine assembly 30a to revolve more than 360°.

External cylindrical portion 41a of hub member 38a being further from supporting base member 33a, as set forth hereinabove, it is necessary that post 49a be longer than post 49 of preferred embodiment 10. It should be appreciated that to permit hub assembly 30a to move axially downstream it will be necessary for torsion spring 44a to flex somewhat in the downstream direction. In so flexing, torsion spring 44a will actually be assisting compression spring 51 in biasing turbine assembly 30a against downstream axial movement resulting from higher fluid flow rates. Whatever affect the downstream flexing of torsion spring 44a has on turbine assembly 30a will be resolved, along with that of compression spring 51, when the meter is calibrated.

It should also be appreciated that greater than 360° of angular motion could be calibrated on a scale with number designations in helical arrangement, such as in alternate embodiment 10a without a compression spring such as spring 51 thereof, by changing only the length of transparent tube 20 and post 49 of preferred embodiment 10 and relying only on downstream flexing of torsion spring 44a for the appropriate bias against downstream axial movement of turbine assembly 30. A further modification which would avoid problems resulting from the flexing of a flat torsion spring would be to leave post 49 its original length and replace the flat torsion spring with a helical or cone-shaped torsion spring with its base oriented downstream. A flatter helical torsion spring might also be used in embodiment 10a with the length of post 49a adjusted accordingly.

Referring now to FIG. 5, whereon another alternate embodiment of the meter is depicted generally at 10b, and as in alternative embodiment 10a, only those elements which are different in a functional and significant way are to be described, another embodiment which permits the calibration of more than 360° of angular rotation of turbine assembly 30b is shown. In the embodiment 10b, cavity 42b is threaded at a pitch equal to the desired spacing of the annular segments of helically arranged numerical designations 32b on cylindrical scale 31b. Axle 36b is of a diameter and threaded at a pitch for threaded cooperation with cavity 42b, its length being such that adequate axial movement of turbine assembly 30b is available between its zero-flow rate position and its highest flow rate position. In the alternative embodiment 10b, compression spring 51b surrounds threaded axle 36b and is retained at its downstream end by a retaining collar 52 mounted on supporting structure 33b and at its upstream end by retaining collar 53 mounted on the downstream end of hub 38b adjacent and surrounding cavity 42b. Vanes 39b of turbine assembly 30b are pitched sympathetically with the threads of axle 36b so as to overcome inertia in turbine assembly 30b. Compression spring 51b in combination with the threaded mating of turbine assembly 30b and threaded axle 36b will permit the calibration and metering of flow rates over a helical course such that more than 360° of angular and axial movement of turbine assembly 30b may be encompassed. While embodiment 10b employs a turbine as does the other two embodiments of my invention disclosed herein, it is the mating threads on axle 36b and in cavity 42b, upon which it relies for its rotational movement, not turbine assembly 30b; hence, other objects than a turbine which would respond to the rate of flow of fluid through the meter could be employed, the turbine providing the functions of overcoming inertia and friction along the threads.

It should also be appreciated that both alternative embodiments 10a and 10b can be constructed so as to be read along a helical scale with any number of annular segments in excess of 360° although a scale of but two revolutions is depicted in FIGS. 4 and 5. It is also well known in the art that magnetic, electronic, or other structures can substitute for springs to provide biasing to the turbine in my fluid flow meter.

Obvious numerous modifications and variations of the present invention are possible in light of the above teachings. It is therefore to be understood that within the scope of the appended claims, the invention may be practised otherwise than as specifically described herein.

I claim:

1. A fluid flow meter, comprising:
   a turbine having a hub for mounting on a supporting structure affixed to the interior of a housing having inlet and outlet ends, for both rotational and downstream movement of said turbine with respect to said supporting structure, in response to the rate of flow of fluid through said housing;
   means for biasing said turbine with forces in directions opposite to those applied to said turbine by said fluid flow; and
   means for determining the combined rotational and downstream displacement of said turbine, whereby said flow rate can be translated to more than 360° of angular displacement of said turbine.

2. The fluid flow meter of claim 1 wherein said biasing means includes a compression spring interposed between said turbine and said supporting structure and a torsion spring affixed at its central end to the hub of said turbine and at its peripheral end to the interior of said housing.

3. The fluid flow meter of claim 1 wherein said supporting structure includes:
   a base member extending to the central area of said housing; and
   a threaded axle protruding upstream from said central area;
   and the hub of said turbine has interior threads corresponding with said axle threads; and said biasing means is a compression spring interposed between said turbine and said base member, whereby said flow rate can be translated to more than 360° of angular displacement of said turbine.

4. The fluid flow meter of claims 1, 2 or 3 wherein said displacement determining means includes a transparent portion of said housing and a means coaxial with and mounted on said turbine for displaying comparative flow rates.

5. The fluid flow meter of claim 4 wherein the displacement determining means further comprises a hairline mark on the transparent portion of said housing.

6. The fluid flow meter of claim 5 wherein the displacement determining means further comprises a helical scale mounted on said flow rate displaying means.

7. A fluid flow meter comprising:
   a cylindrical housing having an inlet and outlet at opposite ends thereof;
   a supporting structure affixed to the interior of said housing, including:
   a base member extending to the central area of said housing, and
   an axle protruding upstream from said central area;
   a turbine having a hub open at its downstream end for mounting on said axle in rotational relation thereto;
   means within said housing for biasing said turbine with forces in at least one direction opposite to that produced by the fluid flow; and
   means for determining the displacement of said turbine.

8. The fluid flow meter of claim 7 wherein said supporting structure further includes a plurality of spaced apart O-rings mounted on said axle for bearing contact with the hub of said turbine.

9. The fluid flow meter of claim 8 wherein said supporting structure further includes bearing means interposed between the upstream end of sid axle and the interior of the unopened end of the hub of said turbine.

10. The fluid flow meter of claim 7 wherein said biasing means is a torsion spring affixed at its peripheral end to the interior of said housing and at its central end to the hub of said turbine.

* * * * *